(12) United States Patent
Wrigley et al.

(10) Patent No.: US 12,735,141 B2
(45) Date of Patent: Sep. 15, 2026

(54) KIT FOR MOUNTING AN ACCESSORY ON HANDGRIPS OF A BICYCLE OR MOTORCYCLE

(71) Applicant: SELLE ROYAL USA, INC., San Clemente, CA (US)

(72) Inventors: Michael Allan Wrigley, Laguna Beach, CA (US); Sebastien Carlachille Salvant, Laguna Beach, CA (US)

(73) Assignee: SELLE ROYAL USA, INC., San Clemente, CA (US)

( * ) Notice: Subject to any disclaimer, the term of this patent is extended or adjusted under 35 U.S.C. 154(b) by 475 days.

(21) Appl. No.: 18/355,894

(22) Filed: Jul. 20, 2023

(65) Prior Publication Data

US 2025/0026431 A1 Jan. 23, 2025

(51) Int. Cl.

| | |
|---|---|
| ***B62K 19/40*** | (2006.01) |
| ***B62J 3/04*** | (2020.01) |
| ***B62J 6/03*** | (2020.01) |
| ***B62J 23/00*** | (2006.01) |
| ***B62K 21/26*** | (2006.01) |

(52) U.S. Cl.

CPC ................. *B62K 19/40* (2013.01); *B62J 3/04* (2020.02); *B62J 6/03* (2020.02); *B62J 23/00* (2013.01); *B62K 21/26* (2013.01)

(58) Field of Classification Search

CPC ...... B62K 19/40; B62K 21/125; B62K 21/26; B62J 3/04; B62J 6/03; B62J 11/00; B62J 23/00; B62J 29/00

See application file for complete search history.

(56) References Cited

U.S. PATENT DOCUMENTS

| | | | | |
|---|---|---|---|---|
| 3,832,912 | A * | 9/1974 | Edwards | B62M 25/04 74/551.8 |
| 3,937,629 | A * | 2/1976 | Hamasaka | B62K 21/125 74/551.8 |
| 11,014,624 | B2 * | 5/2021 | Degarate | B62J 29/00 |
| 11,029,734 | B2 * | 6/2021 | Hawkins, III | H05K 5/0204 |
| 11,738,818 | B1 * | 8/2023 | Zvorsky | B62J 6/03 362/473 |
| 11,745,661 | B2 * | 9/2023 | Stanger | B62J 29/00 74/551.8 |
| 11,897,567 | B2 * | 2/2024 | Wattrus | F16M 11/041 |
| 2003/0106974 | A1 * | 6/2003 | Guertin | B62J 9/27 248/230.5 |
| 2007/0062326 | A1 * | 3/2007 | Laivins | B62J 23/00 74/551.8 |
| 2007/0258758 | A1 * | 11/2007 | Ho | B62J 9/21 403/398 |

(Continued)

FOREIGN PATENT DOCUMENTS

| | | | | |
|---|---|---|---|---|
| DE | 102022103678 | A1 * | 8/2023 | B62J 50/28 |

OTHER PUBLICATIONS

Machine translation of DE 102022103678 A1 obtained on Nov. 17, 2025.*

*Primary Examiner* — Adam D Rogers
(74) *Attorney, Agent, or Firm* — Tutunjian & Bitetto, P.C.

(57) ABSTRACT

The present invention relates to a kit for mounting an accessory, such as a handguard, a bell or a flashlight, on handgrips or handlebars of a bicycle or motorcycle, as well as a bicycle or motorcycle including such a kit. A kit according to the present invention is adaptable and mountable to lock on grips of various sizes.

18 Claims, 11 Drawing Sheets

(56) References Cited

U.S. PATENT DOCUMENTS

| | | | | |
|---|---|---|---|---|
| 2008/0163707 | A1 * | 7/2008 | Wu | G01D 11/30<br>73/866.3 |
| 2008/0203762 | A1 * | 8/2008 | Shimanski | B62J 23/00<br>296/180.1 |
| 2009/0007720 | A1 * | 1/2009 | Tung | B62K 21/12<br>74/551.8 |
| 2009/0255093 | A1 * | 10/2009 | Hsu | B62K 21/26<br>74/551.9 |
| 2012/0279348 | A1 * | 11/2012 | Wood | B62J 23/00<br>74/551.8 |
| 2014/0260772 | A1 * | 9/2014 | Dion | B62K 21/125<br>74/551.8 |
| 2015/0274231 | A1 * | 10/2015 | White | B62J 6/16<br>362/475 |

* cited by examiner 2
6a
6
8a
8
8b
1
8c
4

6b
5
9
9a
2
1
8a
8
8b
10
8c
14
13

5d
5
7a
5a
7
7b
5c
5b
10
5e

5f1
5
X
10d
8
10a
10b
10c
X
16
9
1

2
2
1
8
10

X
X
10d
10a
10b
10c
5f2
5
5f1

5n
5n2
5
5g
5h
HO2
5n1
HO1

11a
11
5b
5
TO
11b
HO1
11a
5c
5d
5a
HO2
5g
5n2
5n1

5b
5
5m
5c
HO2
5a
5d
5b
5n
5m 5e
11a

10b1
10a1
10b2
10c
10d2
10a2
10b
10a

10a2
10d1
10d 10d
10a
10a2
10d2
10b

10a1
10b2
10b1
10d1
10c 14
12
13
5d
7
7b
5n
5c 5b
5
5a
5e
13
5n2
5n1
7d
5a
7
12
14
5g
SE

11a
TD
11
11b 2
8
22
21
8e
15a
8b
16b 8
9
19
16

2
8a
8c
5a
5
5b
9
8b
15a
7
TO 2
8a
8
8c
5a
5
15b
5b
8b
9
TO

7

3

6
4
4
5
6
2
1
2

6
6a
6b1
6b
6c
6d
6e 6
6a
6b1
6b

6a1
6
6a
6b

KIT FOR MOUNTING AN ACCESSORY ON HANDGRIPS OF A BICYCLE OR MOTORCYCLE

TECHNICAL FIELD OF THE INVENTION

The present invention relates to a kit for mounting an accessory on handgrips of a bicycle or motorcycle as well as a bicycle or motorcycle provided with such kit. The accessory can be, for example, a handguard, a flashlight or a bell.

STATE OF THE ART

Handguards have been commonplace in the motorsports industry for some time now on both on and off road motorcycles. The primary purpose of these guards is to protect the hands of a rider from anything which would make a frontal impact with their hands while riding. More recently, handguards have begun gaining popularity among mountain bikers as they face many of the same issues with objects hitting their hands while riding.

Another trend we have seen over the last few years is riders attempting to stream line their cockpits, and reduce the number of clamps on their bars. This is most obvious in the prevalent use of shifters and drop bar remotes that integrate directly with brake clamps, removing the need for an additional clamp to hold these levers. This integration becomes especially important on Ebikes, where the use of additional electrical hardware takes up space on the bars, and doesn't leave room for additional clamps.

It should be also considered that most bicycle handlebars have an outer diameter of 22.2 mm for attaching grips and other accessories. Many brands of grips use a nearly identical lock on grip clamp interface with a 26.6 mm inner diameter clamp diameter, which clamps a flange on the grip in order to lock the grip into position onto the handlebar.

Thus, a solution mountable on handgrips of various sizes would be needed.

Moreover, since the handguards and even other accessories are mounted directly to the rider's handgrips, it is needed to provide a highly flexible attachment method.

With reference to such an aspect, while the guards are attached directly to the clamps that lock on the grips, they handguards need to be able to rotate independently of the grips so riders can optimize the rotation of both parts independently. Note that many grips have contours and surface patterns to optimize contact with different parts of a hand which means that there is often an optimal rotational orientation for the grip. This becomes even more important when adapting the clamp to integrate with the grips of multiple other brands, as the rotational position of the clamp varies from brand to brand.

Another consideration to be made is that due to the variance in grip length, as well as rider preferences, adjustments are an important part of the handguard design.

SUMMARY OF THE INVENTION

It is therefore a principal object of the present invention to provide a new kit for mounting an accessory, such as for example a handguard, a bell or a flashlight, on handgrips of a bicycle or motorcycle.

Another object of the present invention is to provide a new kit as above indicated which is adaptable and mountable to lock on grips of various sizes.

Another object of the present invention is to provide a new kit, which is capable of optimizing space and reduce bulk on the handlebars.

Another object of the present invention is to provide a new kit, which can be adjusted in a simple and efficacy manner.

Another object of the present invention is to provide a new kit for installing and removing quickly and easily accessories.

Another object of the present invention is to provide a new kit as above indicated for mounting handguards in an adjustable manner, so that it is possible to accommodate larger or smaller brake reservoirs, while maintaining the same vertical position and angle of the handguard.

Another object of the present invention is to provide a new bicycle or motorcycle with a kit as above indicated.

According to the present invention a kit as described in the present application is provided.

According to the present invention a bicycle or motorcycle as described in the present application is provided.

According to the present invention a use of a kit as above indicated for mounting a handguard, a bell or a flashlight on a handgrip or on a handlebar of a bicycle or motorcycle is even provided.

The present application refers to preferred and advantageous embodiments of the invention.

BRIEF DESCRIPTION OF THE DRAWINGS

These and other advantages will be better understood by any man skilled in the art from the following description and from the attached drawings, given as a non-limiting example, in which.

DETAILED DESCRIPTION

Figures 1, 2:
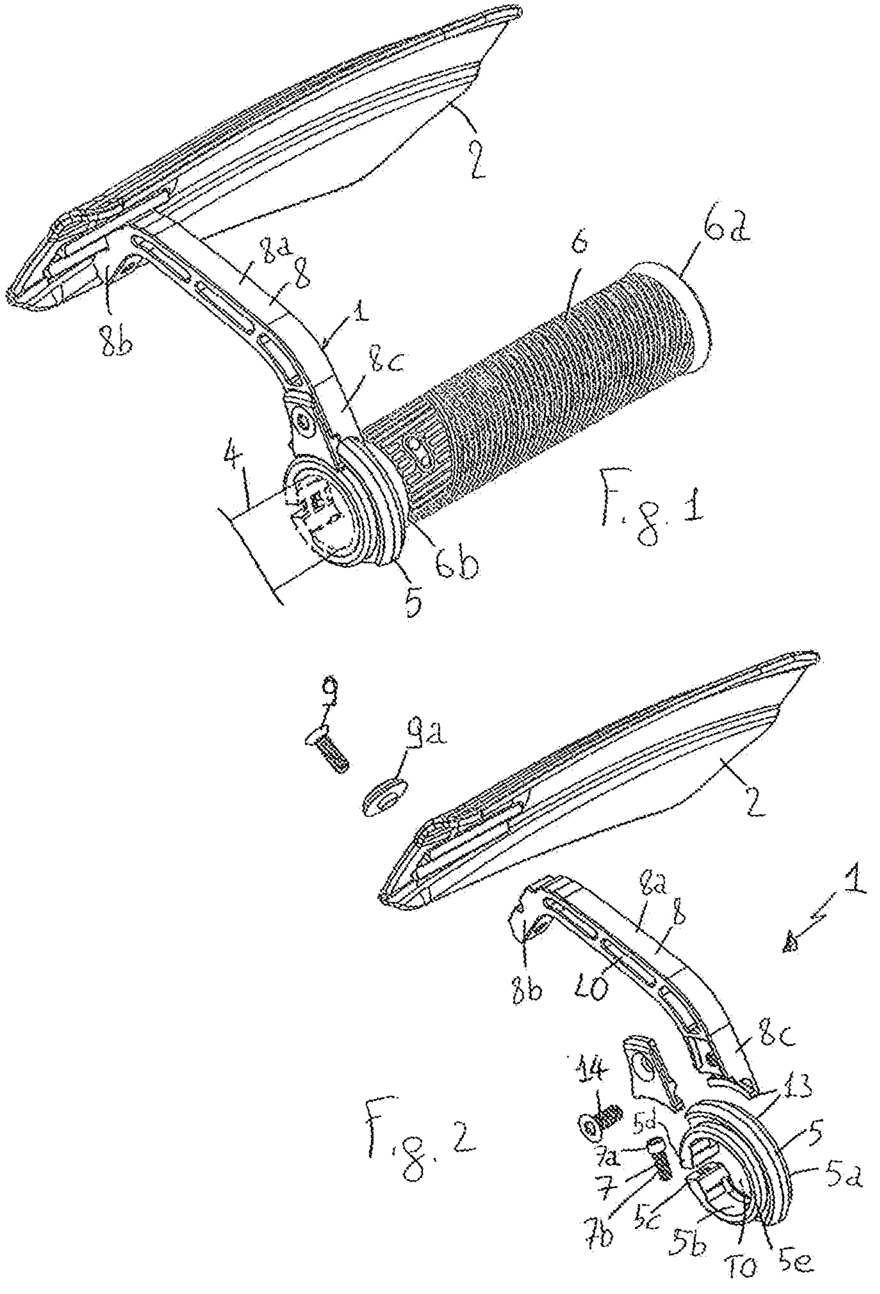
FIG. 1 shows a kit according to the present invention for mounting an accessory, such as a handguard on a handgrip of a bicycle or motorcycle as well as it partly shows the bicycle itself.
FIG. 2 is an exploded view of the kit of FIG. 1, FIGS. 3 and 4 are perspective views, from respective sides, of a kit according to the present invention.
Figures 3, 4:
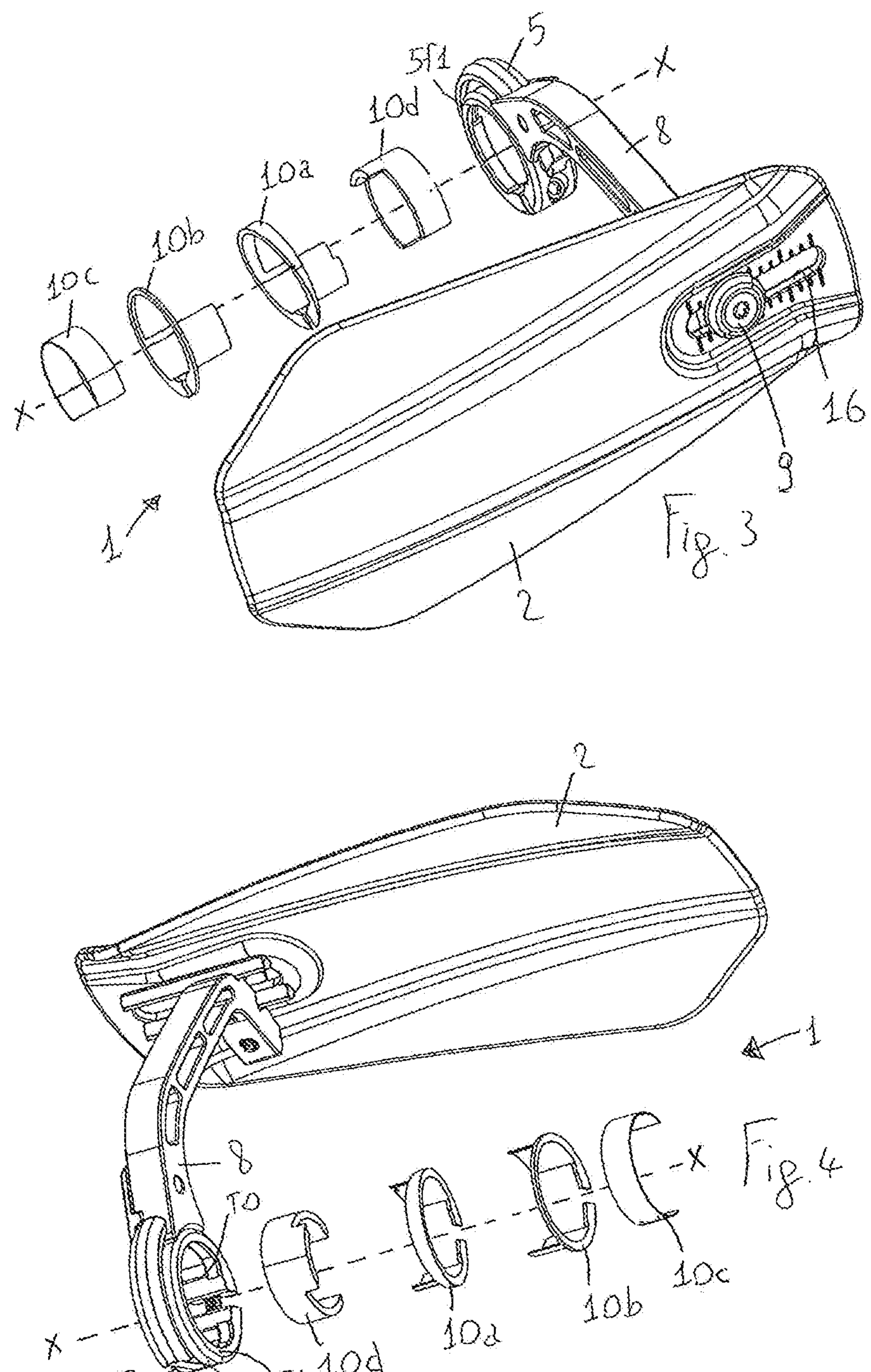
Figures 5, 6, 7:
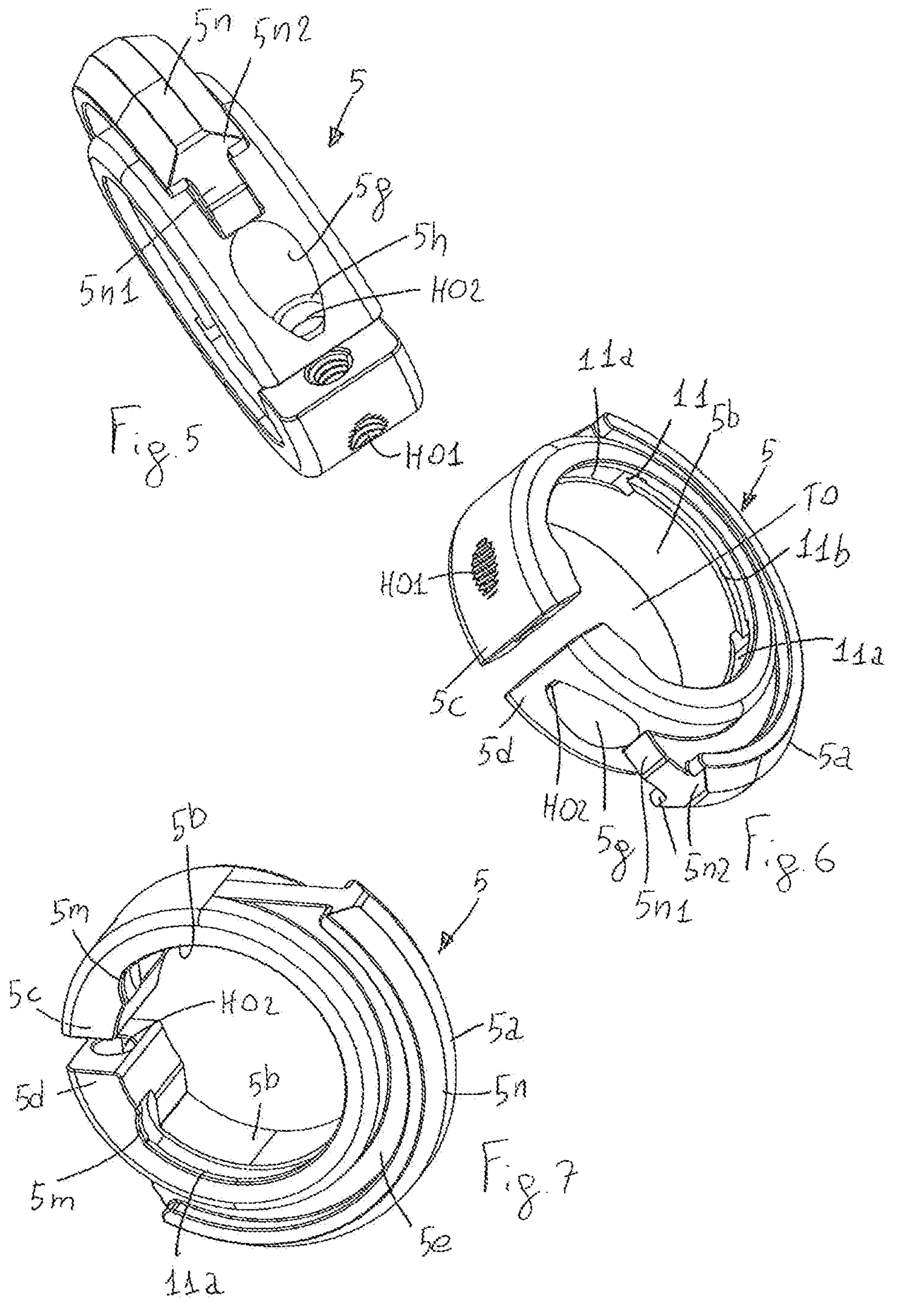
FIGS. 5 to 7 are perspective views, from respective sides, of a clamp of a kit according to the present invention.
Figure 8:
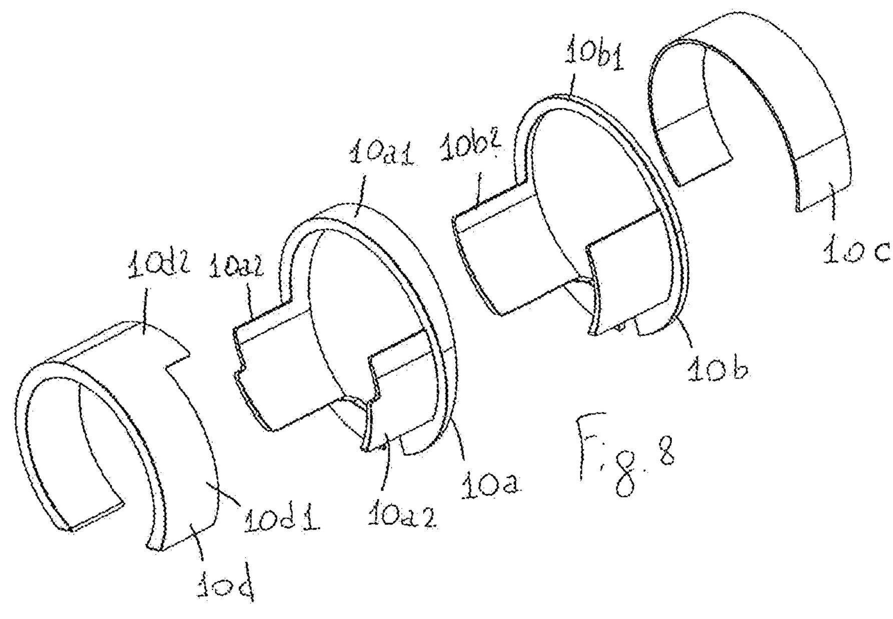
FIGS. 8 and 9 show shims of a kit according to the present invention.
Figure 9:
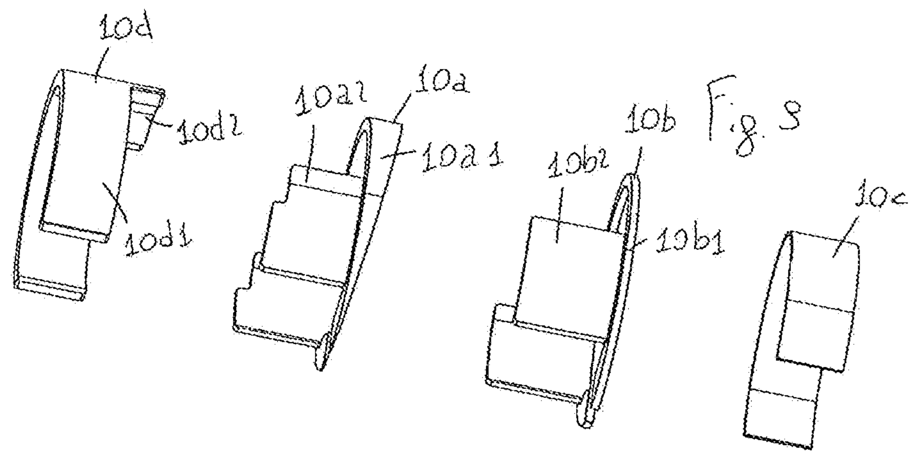
Figures 10, 11:
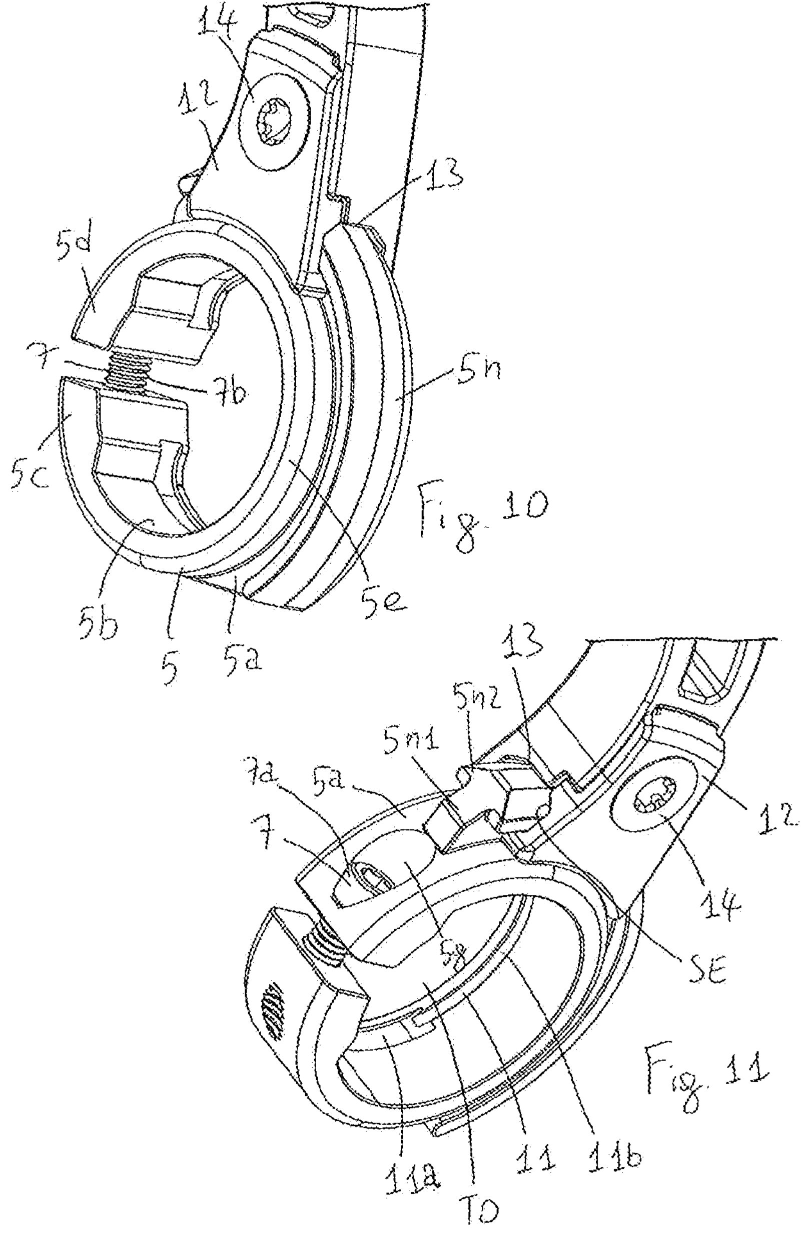
FIGS. 10 and 11 show a detail of the connection among clamp and arm of a kit according to the present invention.
Figure 12:
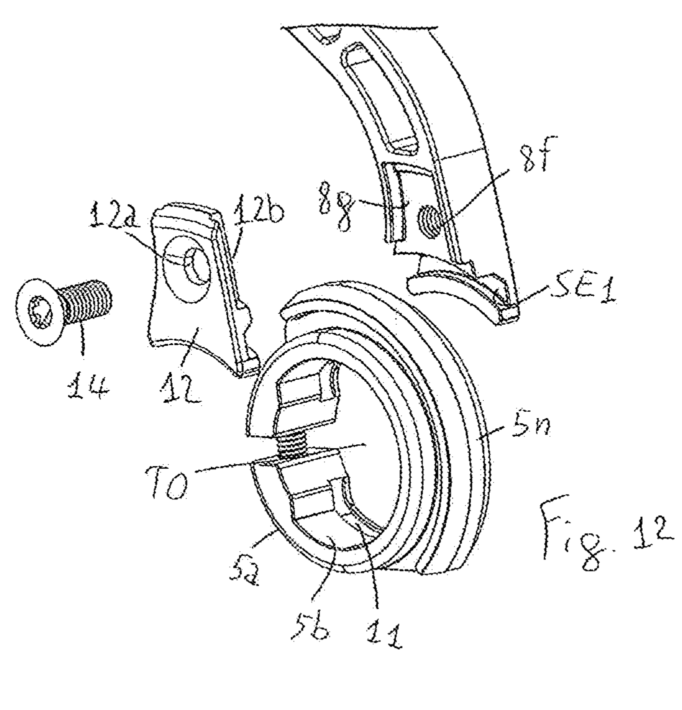
FIGS. 12 and 13 are exploded views showing a detail of the connection among clamp and arm of a kit according to the present invention.
Figure 13:
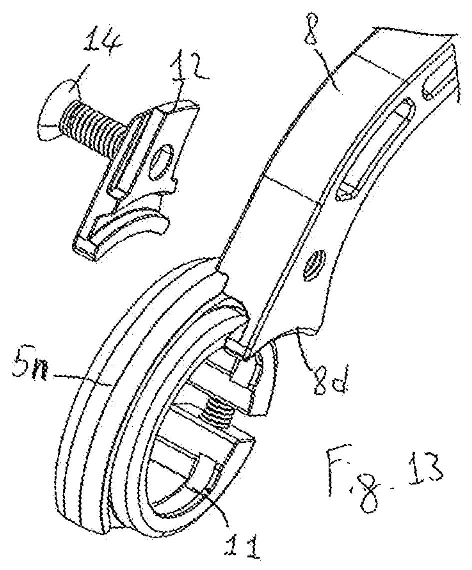
Figures 14, 15:
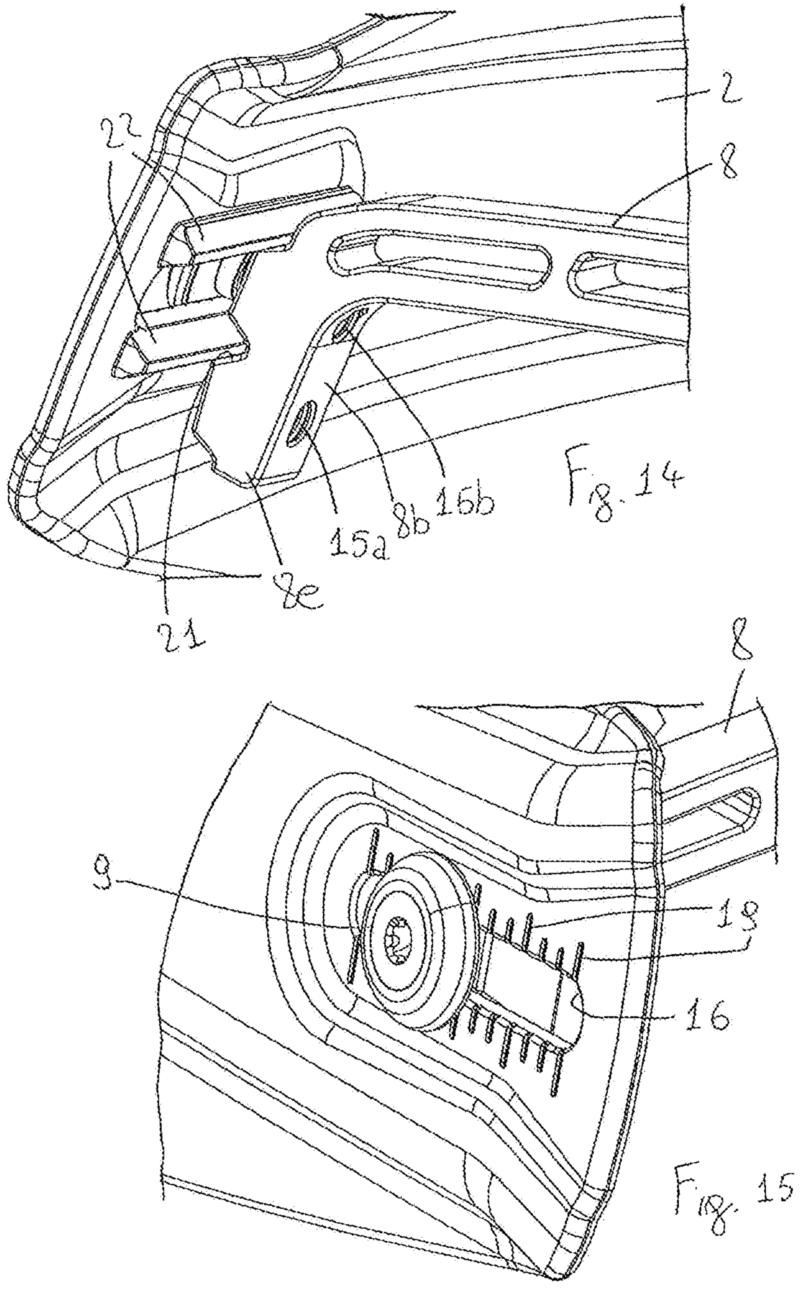
FIGS. 14 and 15 show a detail of the connection among accessory and arm of a kit according to the present invention.
Figures 16, 17:
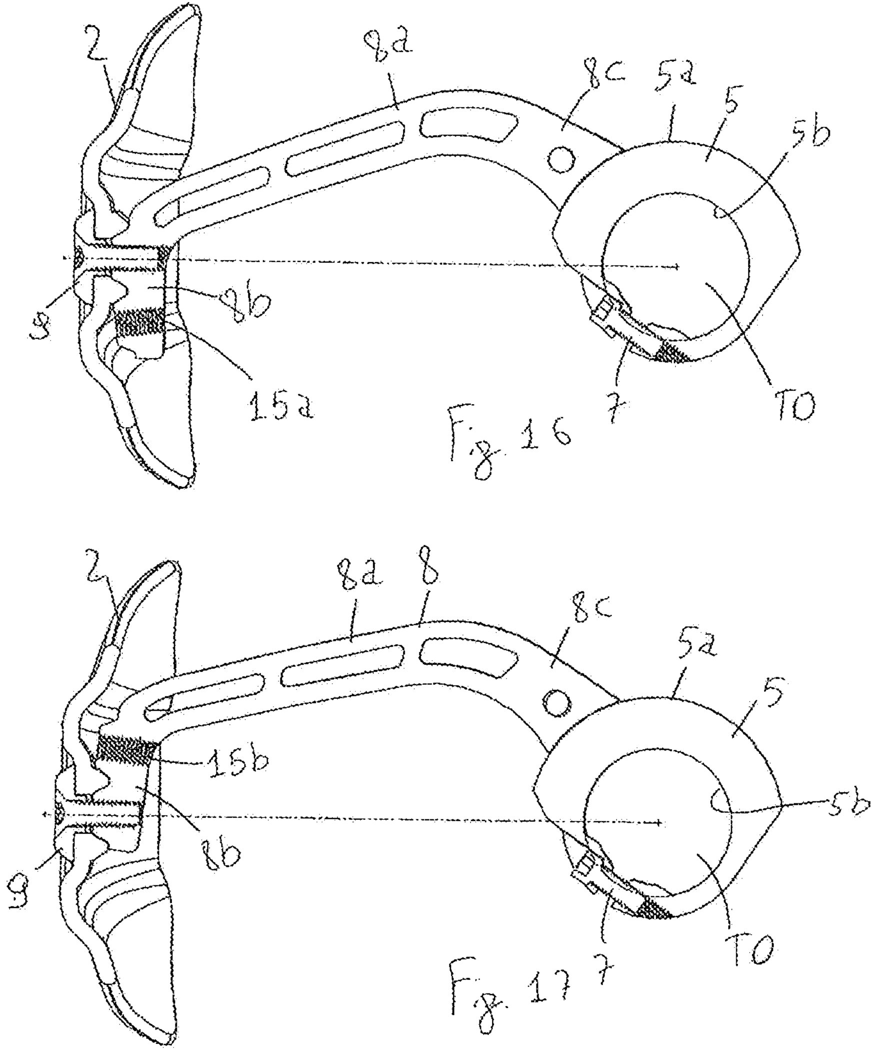
FIGS. 16 and 17 show two connection positions of an accessory on an arm of a kit according to the present invention.

The present invention relates to a kit or equipment or set of components 1 for mounting an accessory 2 on handgrips 6 of a bicycle or motorcycle 3, as well as a bicycle or motorcycle including at least one of such kit 1 mounted on a respective handgrip 6 or the respective handlebar 4 or preferably two kits 1 each mounted on a respective handgrip 6.

More particularly, the kit 1 comprises a clamp 5 to be mounted on handgrips 6 of a bicycle or motorcycle, which clamp includes an outer 5*a* and an inner 5*b* surface delimiting a through opening TO extending along a first axis x-x.

The kit 1 further comprises at least one element for tightening 7 the clamp 5 or rather the respective inner surface 5*b* on a handgrip 6.

To this regard, in accordance with the not limiting embodiment shown in the figures, the clamp 5 comprises or consists of a C-shaped component or an annular main shape without a respective section or portion, with two free ends 5*c*-5*d* facing each other and moveable, i.e., approachable or removable with respect to each other by means of the element for tightening 7 among at least one far removed position (see FIG. 2) and at least one close or clamping position (see FIG. 1). As it will be understood, the clamp 5 is fitted on a handgrip 6 with the ends in the far-removed position, and then the element for tightening 7 is actuated so as to approach the ends 5*c*, 5*d* and thus tighten the clamp 5 on a handgrip 6.

Preferably, the clamp 5 is elastically displaceable (in contrast with the action of the element for tightening 7) among the now described positions or arrangements.

The ends 5*c*-5*d* could be enlarged with respect to the other parts of the clamp 5. More particularly, such ends 5*c*-5*d* could have a thickness gradually decreasing or tapered towards the intermediate portion 5*e* of the clamp 5 itself, so as to define respective steps 5*m*, which, if desired, are radiused.

The element for tightening 7 can include a screw, a bolt, a rivet or the like. With reference to the not limiting embodiment shown in the figures, in both the ends 5*c*, 5*d* of the clamp 5 a through hole or opening HO1, HO2 is delimited, in such a way as the first hole or opening HO1 is substantially aligned to the second hole or opening HO2, so that the element for tightening or screw 7 is inserted and tightened in such aligned holes or openings HO1, HO2. As an alternative, one of the holes or openings HO1, HO2 could be blind.

Of course, if the element for tightening 7 includes a screw or threaded bolt, one or both the holes or openings HO1, HO2 is/are internally threated. To this regard, the clamp 5 can delimit a notch 5*g* with one hole or opening HO2 departing from such notch 5*g* up to a respective end 5*d*, so that the notch 5*g* delimits a shoulder 5*h* for a head 7*a* of the element for tightening 7, whose stem 7*b* extends in the hole or opening HO2 up to reach and engage, in use, the other hole or opening HO1. Of course, such shoulder 5*h* faces away from the zone among the ends 5*c*, 5*d*.

Furthermore, the kit 1 includes an accessory arm or guard arm 8 enbloc with or fixed or removably mountable on the clamp 5 and designed to support the accessory 2.

If the accessory arm or guard arm 8 is removably mountable on the clamp 5, then the kit 1 includes at least one element for connecting 9 an accessory 2 to the arm 8. The at least one element for connecting 9 can include a screw, a bolt, a rivet or the like. If desired, a washer 9*a* is also provided to be mounted among the head of the element for connecting 9 and a respective surface of the accessory 2.

With reference to the not limiting embodiment shown in the figures, the arm 8 has two or more sections one inclined with respect to the other. More particularly, the guard arm 8 can have a main straight section 8*a* and a terminal section 8*b* for connection to an accessory 2, which is inclined or curved with respect to the main straight section 8*a*, if desired, inclined by an angle among 60° and 120° or 70° and 110°.

Moreover, the arm 8 could also include a base section 8*c* of connection to the clamp 5, which base section 8*c* can be curved or inclined with respect to the main straight section 8*a*.

The accessory arm or guard arm 8 can delimit one or more lightening openings LO, if desired through, which openings can be mainly provided, for example, at the main straight section 8*a*.

The main extension axis of the main straight section 8*a*, of the terminal section 8*b*, and, if provided, of the base section 8*c* could lie in a plane substantially orthogonal to the first axis x-x, which, in use, substantially corresponds to the main extension or longitudinal axis of the handgrip 6.

The kit 1 is even provided with at least two shims or spacers 10*a*-10*d* having a different thickness and/or shape one with respect to the other, so that the kit 1 is suitable for making it possible to mount an accessory on two or more handgrips with shape and/or size different from—for example higher or lower than—one another. To this regard, each shim or spacer has a shape and/or size specific for one or more respective handgrips.

In this respect, as it is known, a handgrip 6 has a core 6*a*, usually made of plastic or the like and a padding or covering 6*b* applied or mounted or formed on the core.

Moreover, the handgrip 6 has a main tubular body, if desired closed at a first 6*c*, whereas the other or second end 6*d* is open and fitted on a handlebar 4.

At the second end 6*d*, the core 6*a* can have a portion 6*e* protruding from the padding 6*b*, although this is not needed.

Figures 22, 23, 24:
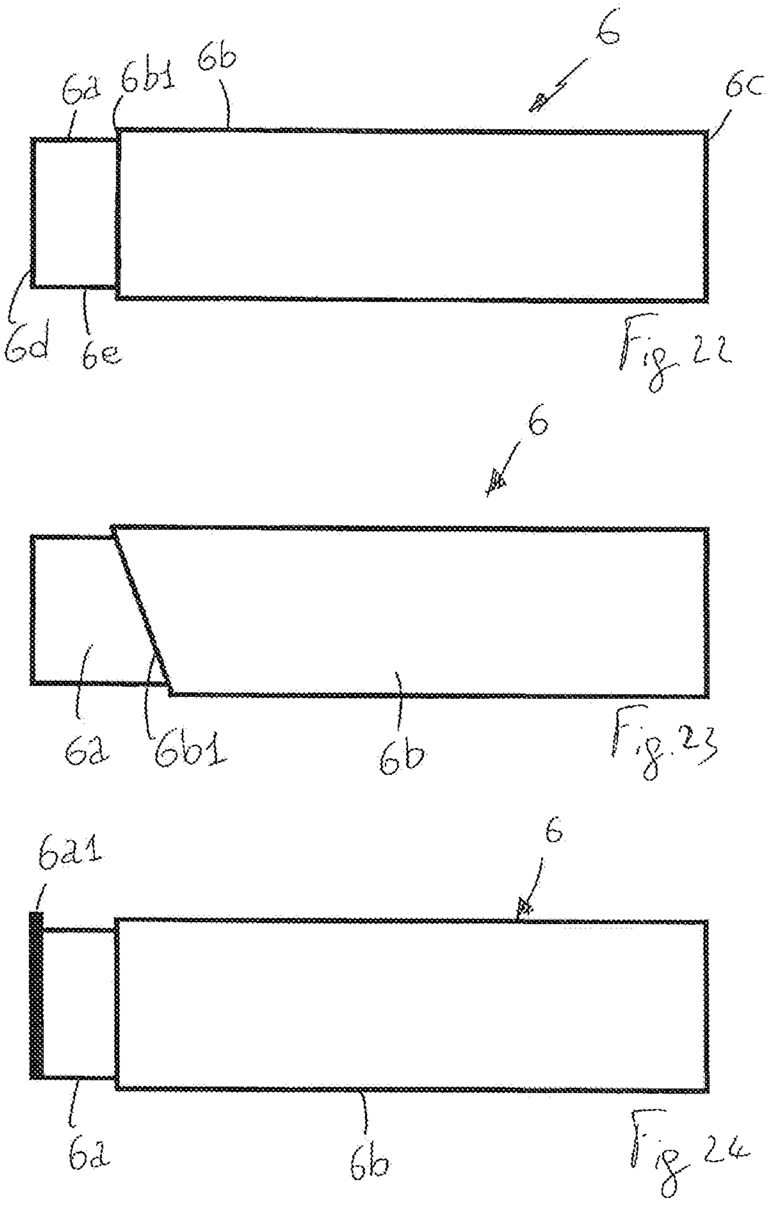

The padding or covering 6*b* could have an end 6*b*1 close to the second end 6*d*, which lies in a plane orthogonal to the main longitudinal axis of the handgrip 6 (see FIG. 22) or even inclined with respect to such plane or rather to the plane where lies the second end 6*d* (FIG. 23).

Moreover, the core 6*a* can have a flanged-like end 6*a*1 (FIG. 24). The flanged-like end 6*a*1 can be annular or partly annular, i.e. with sectioned or removed terminal portions.

The clamp 5 is preferably mounted on the core 6*a* of a handgrip 6 at a second end 6*d* or, if provided, at the protruding portion 6*e* of the core 6*a*.

Advantageously, the inner surface 5*b* of the clamp 5 defines at least one recessed portion 11 suitable for housing at least one portion of a handgrip 6, if provided, a flanged-like end 6*a*1 thereof.

Preferably, the at least one recessed portion 11 has at least one first section 11*a* with a first width and/or depth, and at least one second section 11*b* with a second width and/or depth lower than the first width and/or depth.

Advantageously, the kit 1 comprises at least three shims or spacers 10*a*-10*d*.

The inner surface 5*b* substantially lies on a cylindrical surface and the recessed portion 11 can extend along or is coaxial to the axis of symmetry of such cylindrical surface, which axis, in use, corresponds to the first axis x-x.

Advantageously, the recessed portion 11 includes, from one end or from a zone proximal to one end 5*c* to the other end or to a zone proximal to the other end 5*d*, a first section 11*a*, then a second section 11*b* and subsequently another first section 11*a*. Thus, the first section 11*a* could include one or more parts of the curved extension of the recessed portion, whereas the second section 11*b* includes the other parts thereof, although the second section 11*b* has a width less than the first section 11*a*.

With reference to the not limiting embodiment shown in the figures, the second section 11*b* extends among ¼ and ½ the width of the recessed portion 11.

The first section/s 11*a* could have the same depth of the second section 11*b* or they can have a different depth.

The recessed portion 11 could not extend along or until the ends 5*c*-5*d* of the clamp 5.

The recessed portion 11 is useful for mounting the clamp 5 on a handgrip with a core 6*a* having a flanged-like end 6*a*1 (see FIG. 24).

One or each of the shims could include a C-shaped body extending along a substantially curved arc or length about a central or longitudinal axis, which, in use, is substantially aligned to the first axis x-x.

To this regard, the shims could include a first shim 10*a* shaped so as to be mountable at least partly in the inner surface 5*b*.

More particularly, the first shim 10*a* has a main C-shaped section 10*a*1 and one or more (two in the figures) protruding sections 10*a*2 extending from an edge of the main C-shaped section 10*a*1.

The main C-shaped section 10*a*1 and at least partly the protruding section/s 10*a*2 are designed to be mounted on a handlebar 4, whereas the protruding section/s 10*a*2 is designed to be mounted or rather inserted in the inner surface 5*b* of the clamp 5, with the main C-shaped section 10*a*1 abutting against one 5*f*1 of the sides 5*f*1, 5*f*2 of the clamp 5.

The first shim 10*a* or rather the respective main C-shaped section 10*a*1 has a thickness, i.e. an extension parallel to the central or longitudinal axis of the shim, which can be constant or even it can vary from one end to the other; if desired, the thickness could be minimum at the ends and maximum at the central part or viceversa.

Moreover, the first shim 10*a* or rather the respective main C-shaped section has a first width, i.e. the distance of the respective inner surface from the respective outer surface. Such first width is preferably constant, although the free edges of the main C-shaped section could be enlarged.

In this respect, the outer surface and the inner surface of the shim 10*a* could be not concentric, but, for example actually tangent to each other.

The protruding section/s 10*a*2 has/have a width lower, for example among ⅙ and ½, than the width of the main C-shaped section 10*a*1. In this respect, the protruding section/s 10*a*2 can extend from an inner edge of the main C-shaped section 10*a*1, so that the inner surface delimited by the protruding section/s 10*a*2 is preferably aligned to the inner surface delimited by the main C-shaped section 10*a*1.

The outer surface of the protruding section/s 10*a*2 has a cross-section lower, preferably slightly lower than the inner surface 5*b*, so that the protruding section/s 10*a*2 can be inserted and mounted in the inner surface 5*b*. The outer surface of the main C-shaped section 10*b*1 has instead a cross-section greater than the inner surface 5*b*.

Each protruding section 10*a*2 preferably comprises a curved wall or wall section with an extension lower than the extension of the inner edge of the main C-shaped section 10*a*1, so that each protruding section engages or lines a portion only of the inner surface 5*b*. If two or more protruding sections 10*a*2 are arranged, the same are preferably aligned along an ideal tubular area.

The first shim 10*a* can be mounted, for example, on a handgrip as that shown in FIG. 23.

The shims could even include a second shim 10*b* shaped so as to be mountable at least partly in the inner surface 5*b*.

More particularly, the second shim 10*b* has a main C-shaped section 10*b*1 and one or more (two in the figures) protrusions 10*b*2 extending from an edge of the main C-shaped section 10*b*1.

The main C-shaped section 10*b*1 and at least partly the protrusion/s are designed to be mounted on a handlebar 4, whereas the protrusion/s 10*b*2 is/are designed to be mounted or rather inserted in the inner surface 5*b* of the clamp 5, with the main C-shaped section 10*b*1 abutting against a side 5*f*1 of the clamp 5.

Moreover, the second shim 10*b* has a second width, i.e. the distance of the respective inner surface from the respective outer surface. Such second width is preferably constant, although the free edges of the main C-shaped section could be enlarged.

In this respect, the outer surface and the inner surface of the shim 10*b* could be not concentric, but, for example actually tangent to each other.

The thickness of the second shim 10*b* or rather of the main C-shaped section 10*b*1 could be constant or even it can vary from one end to the other.

The protrusion/s 10*b*2 has/have a width lower, for example among ⅙ and ½, than the width of the main C-shaped section 10*b*1. In this respect, the protruding section/s 10*b*2 can extend from an inner edge of the main C-shaped section 10*b*1, so that the inner surface delimited by the protruding section/s 10*b*2 is preferably aligned to the inner surface delimited by the main C-shaped section 10*b*1.

The outer surface of the protrusion/s 10*b*2 has a cross-section lower, preferably slightly lower than the inner surface 5*b*, so that the protrusion/s 10*b*2 can be inserted and mounted in the inner surface 5*b*. The outer surface of the main C-shaped section 10*b*1 has instead a cross-section greater than the inner surface 5*b*.

Each protruding section preferably comprises a curved wall or wall section with an extension lower than the extension of the inner edge of the main C-shaped section 10*b*1, so that each protruding section engages or lines a portion only of the inner surface 5*b*. If two or more protrusion 10*b*2 are arranged, the same are aligned along an ideal tubular area.

The second shim 10*b* can be mounted, for example, on a handgrip as that shown in FIG. 22.

In addition or alternative to the above, the shims could include a third shim 10*c* shaped so as to be mountable at the inner surface 5*b*.

Moreover, the third shim 10*c* has a third thickness and/or size, i.e. the distance of the respective inner surface from the respective outer surface.

Advantageously, the third shim 10*c* has a thickness equal or even slightly more or less than the first 10*a* and second 10*b* shims, for example from about ½ and 2 the thickness of such shims 10*a*, 10*b* or rather of the protruding section/s or protrusion/s 10*a*2, 10*b*2.

The third shim 10*c* is preferably used with a handgrip having a flanged-like end (see FIG. 24), so that such flanged-like terminal end is caused to enter into the recessed portion 11, whereas the third shim 10*c* is mounted on the protruding portion 6*e* of the handgrip 6 among such flanged-like end 6*a*1 and the end 6*b*1 of the padding or covering 6*b* close to the second end 6*d*.

According to the not limiting embodiment shown in the figures, the shims include a fourth shim 10*d* shaped so as to be mountable at the inner surface 5*b*.

If desired, the fourth shim 10*d* could include a projecting section 10*d*2 extending from an edge of the main body 10*d*1.

In this respect, the thickness of the fourth shim 10*d* is preferably equal or greater than the thickness of the first 10*a* and second 10*b* shims.

The fourth shim 10*d* could be used for mounting the clamp 5 and thus the accessory 2 directly on a handlebar 4 with no handgrip 6 or on a handgrip 6, if desired a handgrip with a flanged-like end, and thus it can be used in two manners.

As it will be understood, each of the shims defines, more particularly as soon as mounted in the clamp 5, a respective through opening and thus makes it possible to mount the accessory on a respective handgrip.

Advantageously, each shim 10*a*-10*d* is mounted in the inner surface 5*b*, when the element for tightening 7 is removed or loosened. Moreover, such assembling process could for example include a step of insertion of one of the shims 10*a*-10*d* in the clamp 5.

Of course, a shim 10*a*-10*d* is inserted with the respective free ends substantially aligned, as much as possible, to the free edges 5*c*, 5*d* of the claim 5.

As a matter of fact, the shims 10*a*-10*d* is used to fill the empty space left by the size difference of the clamp 5 with respect to the handgrip 6 or rather to the respective second end 6*d*, creating an effective clamp.

Preferably, the accessory or guard arm 8 and the clamp 5 include mutual connecting components or portions 13, so that the guard arm 8 can be assembled/disassembled to/from the clamp 5 due to such mutual connecting components or portions 13 even after that the clamp 5 has been mounted on a handgrip 6 or a handlebar 4 owing to the element for tightening 7 and thus the assembly/disassembly step of the accessory arm or guard arm 8 to/from the clamp 5 is irrespective from the mounting/dismounting step of the clamp 5 on a handgrip 6 (see in particular FIGS. 10 to 13) or a handlebar 4. As it will be understood, such an advantageous feature is useful irrespectively from the fact that the clamp is mounted directly on a handgrip or even on a handlebar.

In this respect, the clamp 5 can include a protruding portion or seat 5*n*, whereas the arm 8 is mountable on the protruding portion or seat 5*n* by means of at least one screw, bolt or rivet 14 or even by snap-fitting, forced fitting or in another suitable manner.

If desired, the clamp 5 includes a protruding portion, whereas the kit can advantageously comprise a plate 12, and in such case the protruding portion 5*n* is clamped among the plate 12 and a respective edge 8*d* at the base section 8*c* of the guard arm 8, whereas the at least one screw, bolt or rivet 14 is inserted in holes 8*f*, 12*a* and/or slots aligned of the plate 12 and the guard arm 8.

In this respect, with reference to the not limiting embodiment shown in the figures, an edge 8*d* of the guard arm 8 delimits part SE1 of the seat for the protruding portion 5*n*, whereas the plate 12 delimits another part SE2 of such seat, so that as soon as the plate 12 is abutted against the edge 8*d* of the guard arm 8 a complete seat SE for the protruding portion 5*n* is delimited.

The edge of connection 8*d* alone or with the plate 12 can include or define a shape substantially complementary to the protruding portion 5*n*.

In this respect, the edge 8*d* could have a portion with a shape matching with the shape of part of the optional plate 12, for example with a portion of one of such elements 8*d* or 15 suitable for being partly inserted in a portion of the other 15 or 8*a*.

The protruding portion 5*n* can includes a curved rib or the seat includes a curved housing, whereas the arm 8 has an edge of connection 8*d* slidingly mountable (alone or through a possible plate 12) along the curved rib 5*n* or housing, so that the mounting position of the arm 8 with respect to the clamp 5 can be adjusted by sliding the edge of connection 8*d* along the curved rib 5*n* or housing.

Such adjustment is advantageously obtainable along a circular path with a center lying, in use, on the first axis x-x.

The curved rib or the seat 5*n*, if provided, can extend or be formed at the outer surface 5*a* of the main C-shaped body of the clamp 5.

The curved rib or the seat 5*n*, if provided, can extend for a length among ⅙ and ⅔ of the main C-shaped body of the claim 5.

The cross-section of the protruding portion 5*n* could include a base segment 5*n*1 directly extending from the outer surface 5*a*, and a terminal segment 5*n*2 larger than the base segment 5*n*1 so as to define with the latter a step facing the outer surface 5*a*. The cross-section of the protruding portion 5*n* could for example be I-beam-shaped or T-shaped, with the head of the T being constituted by the terminal segment 5*n*2.

So far as in detail the not limiting embodiment of the edge of connection 8*d* and of the plate 12 is concerned, the edge of connection 8*d* delimits a curved part or half SE1 of the seat, whereas the plate 12 delimits the other curved part or half SE2 of the seat for the protruding portion 5*n*.

Advantageously, the arm 8 could delimit/include, around a respective hole or slot 8*f*, a hollow 8*g* or projecting zone, whereas the plate 12 could include/delimit an embossed or sunken 12*a* portion around a respective hole or slot 12*b*, which portion 12*a* is designed to engage or match the hollow or projecting zone 8*f*, for example to size or snap-fitting.

Preferably, the accessory or guard arm 8 delimits at least two connection holes or at least one slot 15*a*, 15*b* (see in particular FIGS. 14 to 17), for example two threaded holes 15*a*, 15*b* at the terminal end 8*b* distal from the clamp 5 and designed to constitute a mounting end for an accessory 2. The element for connecting 9 an accessory 2 to the arm 8 is engageable in each of the at least two connection holes or at least one slot 15, so that it is possible to mount an accessory in at least two different arrangements with respect to the guard arm 8.

Advantageously, the connection holes 15*a*, 15*b* are formed a first hole 15*a* at a position proximal to the free end 8*e* of the terminal end 8*b* of the arm 8 and the other 15*b* at a position distal from such free end 8*e* or rather at a distance from the latter greater than the first hole 15*a*.

As an alternative, the accessory or guard arm 8, at the terminal end 8*b*, delimits a slot with an extension greater than a hole, i.e. a narrow, elongated depression or groove or slit.

According to a less preferred alternative, the accessory or guard arm 8 delimits one connection hole or slot only at the terminal end 8*b*.

Figures 18, 19:
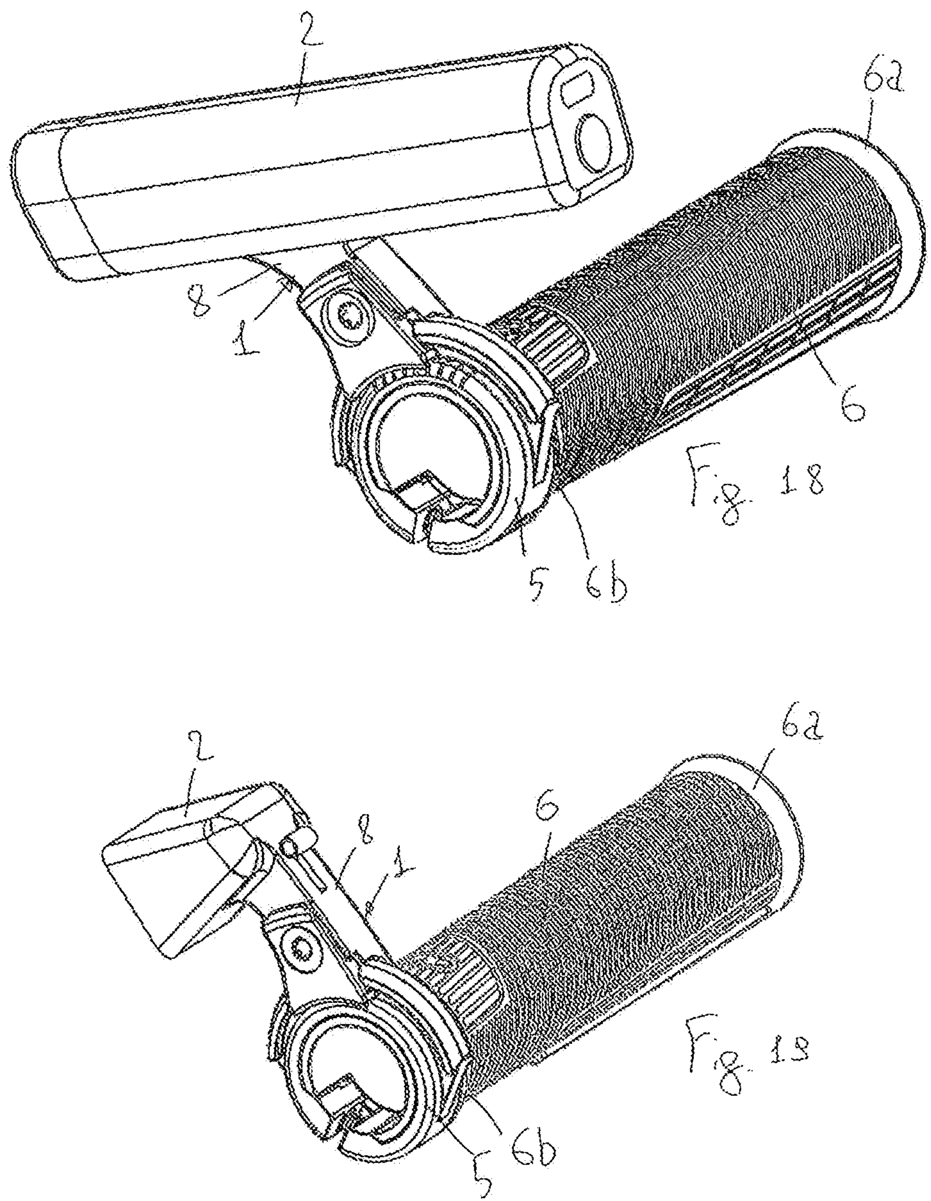
FIGS. 18 and 19 show a kit according to the present invention for mounting a flashlight or bell, respectively, on a handgrip of a bicycle or motorcycle.

The kit 1 can also include an accessory 2, for example a handguard (see FIG. 1), a flashlight (see FIG. 18) or a bell (see FIG. 19).

If the accessory is a handguard 2, the same can be for example plate-shaped, if desired with a curved extension or two or three portions slightly inclined with respect to one another.

The handguard 2 or even another accessory could be made of any suitable material, for example of plastic.

The accessory 2 preferably delimits a hole or preferably a slot 16 (i.e. a narrow, elongated depression or groove or slit with an extension greater than a substantially cylindrical hole) or a number of holes for receiving the at least one element for connecting 9 in a number of positions, thereby ensuring different assembling positions of the accessory on the kit, and, in turn, on a handgrip 6 or handlebar 4. The slot 16 could extend or the holes can be aligned, in use, parallel to the first axis x-x.

Moreover, one or more reference components 19 could be formed or provided at the slot 16, if provided, for example along the perimeter of the slot 16, which component/s 19 is/are suitable for providing a user with information concerning the mutual position of the accessory or handguard 2 with respect to the arm 8, and in turn, to the handgrip 6 or handlebar 4. Such reference means 19 could include notches, numbers, lugs or the like means.

Advantageously, the kit 1 further includes at least one positioning component 21, 22 designed to provide a mutual engagement of the accessory or handguard 2 on/to the arm 8 to be fixed or stabilized through the at least one element for connecting 9. Thus, the at least one position component 21, 22 helps a user during the connection step of the accessory or handguard 2 on/to the arm 8.

In this respect, the terminal end 8*b* could delimit one or more hollow zones 21, whereas the accessory 2 includes, at a surface designed to be faced towards or abutted against the terminal end 8*b*, one or more lug components 22 to be engaged or fitted, for example to size or snap-fitted, each in a respective hollow zone 21.

As an alternative, the hollow zone/s is/are formed at the accessory 2, whereas the lug component/s is/are provided in the terminal end 8*b*.

The lug component/s 21 could be suitably shaped, for example tapered, if provided in the accessory 2, in a direction moving away from the latter, and if provided in the terminal end 8*b*, in a direction moving away from the latter.

The hollow zones 22 could be suitably shaped, for example tapered, if provided in the terminal end 8*b*, in a direction moving away from the accessory 2, and if provided in the accessory 2, in a direction moving away from the terminal end 8*b*.

With reference to the not limiting embodiment shown in the figures, at least one lug component 22 has a main extension direction substantially parallel to the main extension of the slot 16 or to the direction of alignment of the holes in the accessory 2.

Advantageously, the length of the at least one lug component 22 along such main extension is substantially equal to the length of the slot 16 along the respective main extension or the ratio among such length ranges for about 0.5 and 1.5, more preferably 0.8 and 1.2.

Preferably, two lug components 22 are provided, one extending below and the other extending above the slot 16 or lines of holes in the accessory 2, whereas the terminal end 8*b* could delimit at least two hollow zones 21, one above a hole or slot 15*a*, 15*b*, and the other below the hole or slot 15*a*, 15*b*.

More preferably, if two (if desired, through) holes 15*a*, 15*b* are delimited in the terminal end 8*b*, three lug components 22 can be provided, a first one extending below a hole 15*a*, a second extending above the other hole 15*b*, and a third extending between the holes 15*a*, 15*b*.

In such case, the mutual engagement of the first and second leg components 22 with the hollow zones 21, ensures one of the holes 15*a* to be open and engageable by the element for connecting 9, whereas the mutual engagement of the second and third leg components 22 with the hollow zones 21, ensures another of the holes 15*b* to be open and engageable by the element for connecting 9.

So far as the material of the kit are concerned, the same can be made in any suitable material, for example:

- the shims 10*a*-10*d* can be made of plastic such as, for example, polypropylene,
- the clamp 5 can be made of aluminum,
- the guard arm 8 can be made of aluminum, and/or
- the accessory 2 can be made of plastic, such as, for example, polypropylene.

Figures 20, 21:
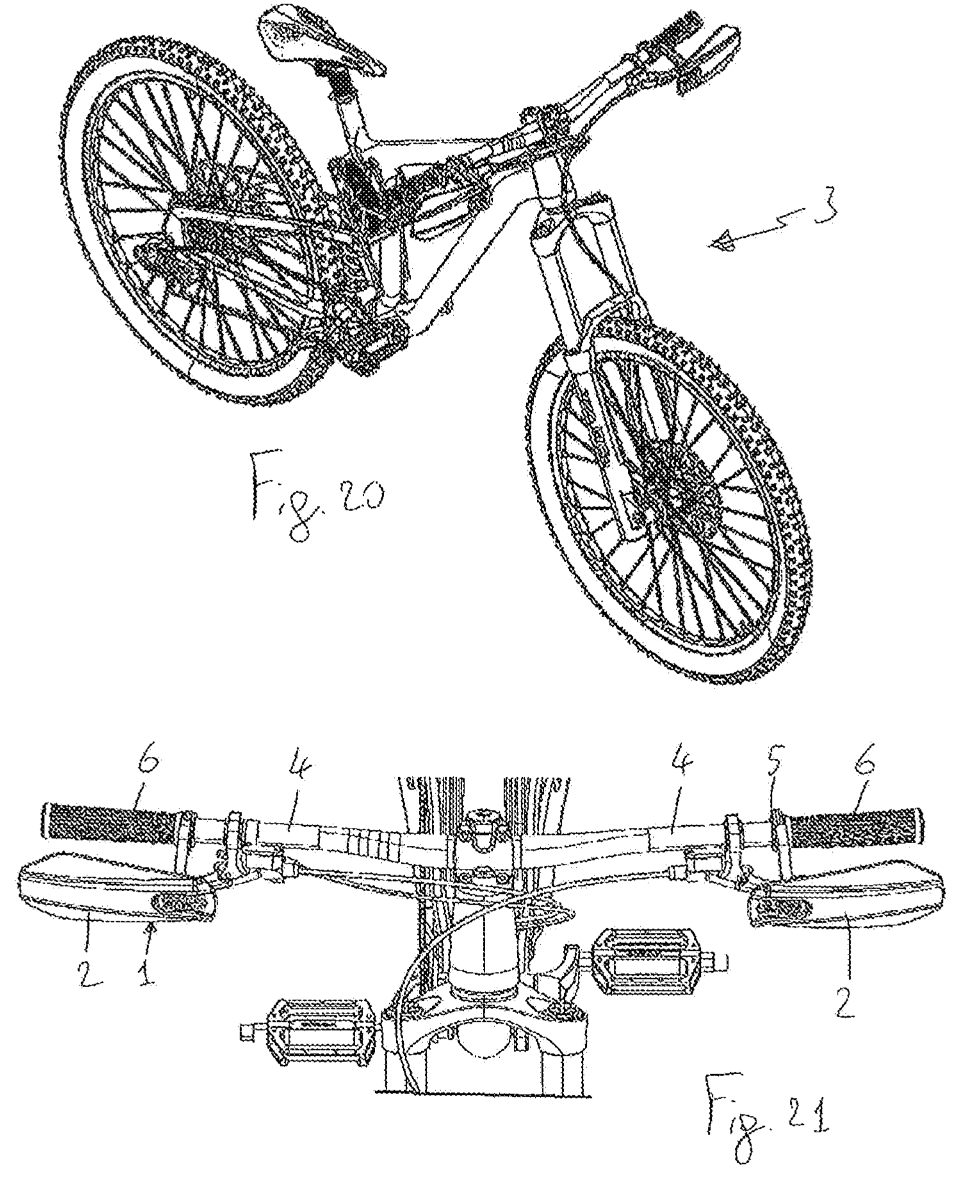
FIG. 20 shows a bicycle according to the present invention.
FIG. 21 illustrates a detail on an enlarged scale of FIG. 20, and FIGS. 22 to 24 show different handgrips to be used with a kit of the present invention for obtaining a bicycle according to the present invention.

Subject-matter of the present invention is also a bicycle or motorcycle (see FIG. 20) including a handlebar 4 as well as two handgrips 6 mounted on such handlebar 4 and at least one kit 1, and in such case, the clamp 5 is mounted on one handgrip 6 with at least one of the shims or spacers 10*a*-10*c* mounted or assembled therein or at the respective inner surface 5*b* and directly in contact with the handgrip 2 or rather with the core 6*a* thereof. As an alternative the clamp 5 is mounted on the handlebar 4, optionally with one 10*d* of the shims or spacers mounted or assembled therein or at the respective inner surface 5*b*.

Subject-matter of the present invention is also the use of a kit as above indicated for mounting a handguard, a bell or a flashlight on a handgrip or on a handlebar of a bicycle or motorcycle.

Of course, the clamp 5 could also be mounted on the handlebar 4 and not on the handgrip 6 with the shim or spacer 10*d* mounted or assembled therein or at the respective inner surface 5*b*.

As it will be understood, with handgrips having specific size, no shim 10*a*-10*d* is needed.

Anyway, the shims 10*a*-10*d* are advantageous but not mandatory components of the present invention.

Therefore, the present invention relates to a kit advantageously:

1) with a clamp 5 adaptable and mountable to lock on handgrips of various sizes by means of special shims, and optionally by machining or obtaining a recessed portion 11 on the inside of the clamp 5;
2) with means suitable for mounting an accessory, such as a handguard directly to the clamp to optimize space and reduce bulk on the handlebars;
3) with means for making it possible to adjust laterally and/or vertically an accessory,
4) owing to which it is possible to adjust the accessory arm or guard arm, for example to accommodate larger or smaller brake reservoirs while maintaining the same vertical position and angle of the (plastic) guard,
5) ensuring a quick and easy installation and removal of accessories on a handgrip via a lock on grip clamp that can stay on the bicycle or motorcycle, for example bicycle or motorcycle independently of the removable accessories.

1. Clamp Adaptable and Mountable to Lock on Handgrips of Various Sizes by Means of Special Shims, and Machining on the Inside of the Clamp Owing to the present invention, if two or more shims 10*a*-10*d* and optionally a recessed portion 11 are present, it is possible to adapt a single clamp 5 to many different brands of grips that have different flange design.

So for example a grip with a 26.6 mm outer flange diameter does not need any shim or the fourth shim 10*d*, whereas the clamp being used with a grip that has a smaller 25ish mm diameter, could be used together with the first 10*a* or second 10*b* shim.

By way of example, four different shims have been shown allowing the same clamp 5 to accommodate a number of handgrips. One of the shims, for example the fourth shim 10*d* can also allow the clamp 5 to be mounted directly to the handlebars without the use of a handgrip.

2. Handguards Mountable Directly to the Clamp to Optimize Space and Reduce Bulk on the Handlebars According to the present invention, a rotational adjustment flexibility is advantageously achieved owing to the protruding portion 5*n*, mainly referring to the case where a T-shaped or I-beam clamp 5 is used running around the outer edge of the clamp. The guard arm and clamp plate slot into that I beam using it as a rail. They can slide freely along the rail until the screw or bolt are tightened, at which point the arm 8 is locked into place.

3. Working of the Handguards can be Adjusted Laterally or Vertically

If the accessory delimits a slot 16, it is possible to obtain a lateral adjustment of the position of the accessory. This allows for infinite adjustability within a certain range.

Moreover, should the protruding portion 5*n* be provided and shaped as a curved rib or a seat is arranged shaped as a curved housing, a vertical adjustment of the position of the accessory is obtainable.

Thus, the accessory, such as a handguard can be adjusted vertically by rotating the handguard up or down. This does adjust the angle of the guard slightly.

4. Guard Arms can be Adjusted to Accommodate Larger or Smaller Brake Reservoirs/Controls while Maintaining the same Vertical Position and Angle and the Plastic Guard If the guard arm 8 delimits at least two connection holes or slot/s 15*a*, 15*b* at the terminal end 8*b* distal from the clamp 5, one can decide to connect the handguard at one hole or slot 15*a* (see FIG. 16), thereby allowing more room for brake reservoirs/controls under the arm with respect to an attachment at the other hole or slot 15*b* (see FIG. 17), while maintaining the guard in the same position.

The intention of these mounting points is to allow users to adjust rotation of the arm of handguards without moving the handguard itself. This allows users to adjust the handguards to accommodate larger brake calipers/controls without compromising the position of the plastic guards. With both mounting points, the guard remains vertical when in line with the center of the clamp.

5. Quick and Easy Installation and Removal of Grip Mounted Accessories Via a Lock on Grip Clamp that can Stay on the Bike Independently of the Removable Accessories Another advantageous feature of the kit of the present invention is how it can be easily installed and uninstalled depending on whether the rider wants to use the accessory or handguard on a specific ride.

In this respect, the lock on clamp can be used independently of the accessories or handguards themselves, owing to the presence of mutual connecting components or portions 13, so that the guard arm 8 can be assembled/disassembled to/from the clamp 5 due to such mutual connecting components or portions 13 even after that the clamp 5 has been mounted on a handgrip owing to the element for tightening 7.

Once the new lock on ring has been installed, a user only has to slide the guards into place and tighten 1 bolt to secure the guards.

The present invention has been described according to a preferred embodiment, but equivalent variants can be devised without departing from the scope offered by the following claims.

The invention claimed is:

1. A kit for mounting an accessory on handgrips of a bicycle or motorcycle, comprising:

a clamp to be mounted on each of the handgrips of the bicycle or motorcycle including an outer surface and an inner surface delimiting a through opening extending along a first axis, at least one element for tightening said clamp or rather the respective inner surface on each handgrip, an accessory arm or a guard arm enbloc with or fixed or removably mountable on said clamp and designed to support said accessory, at least one element for connecting the accessory to said accessory arm or said guard arm, at least two shims or spacers having a different thickness and/or shape one with respect to the other, so that the kit is suitable for making it possible to mount the accessory on the handgrips with shape and/or size different from one another.

2. The kit as claimed in claim 1, wherein said shims include at least one shim with a main C-shaped section and one or more protruding sections extending from an edge of the main C-shaped section, the main C-shaped section and said one or more protruding sections being designed to be mounted on a handlebar, whereas the one or more protruding sections being designed to be inserted in the inner surface of the clamp, with the main C-shaped section abutting against one side of the clamp.

3. The kit as claimed in claim 2, wherein said main C-shaped section has a thickness comprised of an extension parallel to a central or longitudinal axis of each shim, wherein said thickness varies from one end to the other, so that it is minimum at each end of each of the at least two shims or spacers and maximum at a central part of each of the at least two shims or spacers, or viceversa.

4. The kit as claimed in claim 2, wherein said one or more protruding sections extend from an inner edge of the main C-shaped section, so that the inner surface delimited by said one or more protruding sections is aligned to an inner surface delimited by the main C-shaped section, whereas an outer surface of said one or more protruding sections has a cross-section lower than the inner surface of said clamp, so that the protruding section/s can be inserted and mounted in the inner surface of said clamp.

5. The kit as claimed in claim 1, wherein the at least two shims comprises at least three shims having a different thickness and/or shape one with respect to the other, so that the kit is suitable for making it possible to mount the accessory on the handgrips with shape and/or size different from one another.

6. The kit as claimed in claim 1, wherein said inner surface of the clamp defines at least one recessed portion suitable for housing a flanged-like end of each of the handgrips.

7. The kit as claimed in claim 1, wherein the accessory comprises a handguard, a bell or a flashlight.

8. The kit as claimed in claim 1, wherein said accessory delimits a slot or a number of holes for receiving said at least one element for connecting in a number of positions.

9. A kit for mounting an accessory on handgrips or handlebars of a bicycle or motorcycle, comprising:

a clamp to be mounted on the handgrip or on the handlebar of the bicycle or motorcycle including an outer and an inner surface delimiting a through opening extending along a first axis, at least one element for tightening said clamp or rather a respective inner surface on the handgrip or the handlebar, an accessory arm or guard arm removably mountable on said clamp and designed to support said accessory, at least one element for connecting the accessory to said accessory arm or said guard arm, said accessory arm or said guard arm and said clamp including mutual connecting components or portions, so that said accessory arm or guard arm can be assembled/disassembled to/from said clamp due to the mutual connecting components or portions even after said clamp has been mounted on the handgrip or the handlebar owing to said at least one element for tightening and thus the assembly/disassembly step of said accessory arm or guard arm to/from said clamp is irrespective from the mounting/dismounting step of said clamp on the handgrip or the handlebar, wherein said clamp includes a protruding portion, whereas the accessory arm or guard arm is mountable on said protruding portion by means of at least one screw, bolt or rivet, and/or wherein said kit comprises a plate, said protruding portion being clamped among said plate and said accessory arm or guard arm, whereas said at least one screw, bolt or rivet is inserted in holes and/or slots aligned of said plate and said accessory arm or guard arm.

10. The kit as claimed in claim 9, wherein said protruding portion includes a curved rib, whereas said accessory arm or guard arm has an end of connection slidingly mountable along the curved rib, so that a mounting position of the accessory arm or guard arm with respect to the clamp can be adjusted by sliding the end of connection along the curved rib.

11. The kit as claimed in claim 10, wherein a cross-section of the protruding portion include a base segment directly extending from an outer surface, and a terminal segment larger than the base segment so as to define with the latter a step facing the outer surface, the cross-section of the protruding portion being I-beam-shaped or T-shaped, with the head of the T being constituted by the terminal segment.

12. The kit as claimed in claim 9, wherein said accessory arm or guard arm delimits at least two connection holes or at least one slot at a terminal end distal from the clamp and designed to constitute a mounting end for the accessory, said at least one element for connecting an accessory to said accessory arm or guard arm being engageable in each of said at least two connection holes or in said at least one slot, so that it is possible to mount an accessory in at least two different arrangements with respect to the accessory arm or guard arm.

13. The kit as claimed in claim 12, wherein a first one of the connection holes is formed at a position proximal to a free end of the accessory arm or guard arm and another connection hole at a position distal from said free end or rather at a distance from the latter greater than the first hole.

14. The kit as claimed in claim 9, further comprising the accessory, wherein the accessory comprises a handguard, a bell or a flashlight, said accessory arm or guard arm being designed to support said accessory.

15. The kit as claimed in claim 14, wherein said accessory delimits a slot or a number of holes for receiving said at least one element for connecting in a number of positions.

16. A bicycle or motorcycle including a handlebar as well as two handgrips mounted on such handlebar and at least one kit for mounting an accessory on one of said handgrips or on said handlebar, said bicycle or motorcycle comprising:

the accessory, a clamp mounted on at least one handgrip of the bicycle or motorcycle including an outer and an inner surface delimiting a through opening extending along a first axis, at least one element for tightening said clamp or rather a respective inner surface on said at least one handgrip of the bicycle or motorcycle, an accessory arm or guard arm enbloc with or fixed or removably mountable on said clamp and designed to support said accessory, at least one element for connecting the accessory to said accessory arm or guard arm, at least one shim or spacer at least partly mounted in said clamp.

17. The bicycle or motorcycle as claimed in claim 16, wherein said at least one shim has a main C-shaped section and one or more protruding sections extending from an edge of the main C-shaped section, the one or more protruding sections being inserted in the inner surface of the clamp, with the main C-shaped section abutting against one of the sides of the clamp.

18. A bicycle or motorcycle including a handlebar as well as two handgrips mounted on such handlebar and at least one kit for mounting at least one accessory on at least one handgrip of said two handgrips or on said handlebar, said bicycle or motorcycle comprising:

the at least one accessory, a clamp mounted on said at least one handgrip of said two handgrips or on the handlebar of the bicycle or motorcycle including an outer and an inner surface delimiting a through opening extending along a first axis, at least one element for tightening said clamp or rather a respective inner surface on said at least one handgrip of said two handgrips or the handlebar, an accessory arm or guard arm removably mountable on said clamp and designed to support said at least one accessory, at least one element for connecting said at least one accessory to said accessory arm or guard arm, said accessory arm or guard arm and said clamp including mutual connecting components or portions, so that said accessory arm or guard arm can be assembled/disassembled to/from said clamp due to such mutual connecting components or portions even after said clamp has been mounted on the handgrip or handlebar owing to said at least one element for tightening and thus the assembly/disassembly step of said accessory arm or guard arm to/from said clamp is irrespective from a mounting/dismounting step of said clamp on the handgrip or handlebar.

* * * * *